UNITED STATES PATENT OFFICE.

R. BORCHERDT AND HENRY BERGMAN, OF TOMPKINSVILLE, NEW YORK.

IMPROVED COMPOSITION FOR THE MANUFACTURE OF TOYS.

Specification forming part of Letters Patent No. 51,009, dated November 21, 1865.

*To all whom it may concern:*

Be it known that we, RICHARD BORCHERDT, and HENRY BERGMAN, of Tompkinsville, in the county of Richmond and State of New York, have invented a new and Improved Composition for Imitation Caoutchouc; and we do hereby declare that the following is a full, clear, and exact description thereof, which will enable those skilled in the art to make and use the same.

This composition is intended particularly for the purpose of making the bodies of little dolls or other human figures, or for making toys of any description, and its great advantages are that it is cheap, easily molded, very tough, and not changed by heat or cold.

The ingredients which we use for our composition are glue, sugar, glycerine, and Perry's white, (composed of chalk prepared and ground to an impalpable powder;) or sometimes we substitute honey for sugar. The proportion in which these indredients are mixed together is about as follows: glue, five pounds; sugar or honey, ten pounds; glycerine, two and one-half pounds; Perry's white, three pounds. We first soak the glue in water for twenty-four hours before using it, then pour off the water, melt it over a gentle fire, add the sugar or honey, and boil for about two minutes.

From the Perry's white we form a paste by adding water gradually until the consistency of the paste is equal to that of the glue and sugar, and then the two solutions are mixed, and the mixture is boiled for about five minutes, and the glycerine is stirred in when it is ready for use. By pouring it into suitable molds the desired figures are produced.

By the use of the glycerine the composition is rendered moist and prevented from drying and becoming hard in the course of time.

The honey is used in place of sugar particularly in cold weather.

By adding suitable pigments, any desired color can be given to this composition.

What we claim as new, and desire to secure by Letters Patent, is—

1. The within described composition made of glue, sugar or honey, and Perry's white, mixed together in about the proportions, and substantially in the manner set forth.

2. The use of glycerine in combination with the above-named composition, substantially as and for the purpose described.

The above specification of our invention signed by us this 26th day of September, 1865.

R. BORCHERDT.
HENRY BERGMAN.

Witnesses:
M. M. LIVINGSTON,
WM. E. LYNN.